US012739704B2

(12) United States Patent
Natarajan et al.

(10) Patent No.: US 12,739,704 B2
(45) Date of Patent: Sep. 15, 2026

(54) CONFIGURE AND ENFORCE MAXIMUM DATA RATE PER UE PER NETWORK SLICE

(71) Applicant: NOKIA SOLUTIONS AND NETWORKS OY, Espoo (FI)

(72) Inventors: Rajesh Babu Natarajan, Bangalore (IN); Gayathri Tadas, Bengaluru (IN); Kavitha Nanjangud Keerthi, Bangalore (IN); Alessio Casati, West Molesey (GB); Nagendra Bykampadi, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 766 days.

(21) Appl. No.: 17/921,831

(22) PCT Filed: Apr. 29, 2021

(86) PCT No.: PCT/EP2021/061217
§ 371 (c)(1),
(2) Date: Oct. 27, 2022

(87) PCT Pub. No.: WO2021/219767
PCT Pub. Date: Nov. 4, 2021

(65) Prior Publication Data

US 2023/0180061 A1 Jun. 8, 2023

(30) Foreign Application Priority Data

Apr. 30, 2020 (IN) ............................. 202041018543

(51) Int. Cl.
*H04W 36/22* (2009.01)
*H04W 28/02* (2009.01)
(Continued)

(52) U.S. Cl.
CPC ....... *H04W 28/20* (2013.01); *H04W 28/0257* (2013.01); *H04W 28/0284* (2013.01); *H04W 48/18* (2013.01); *H04W 76/15* (2018.02)

(58) Field of Classification Search
CPC ..... H04W 28/20; H04W 76/30; H04W 76/15; H04W 28/0284; H04W 28/0257
See application file for complete search history.

(56) References Cited

U.S. PATENT DOCUMENTS

2017/0339609 A1* 11/2017 Youn ..................... H04W 76/11
2017/0359749 A1* 12/2017 Dao ..................... H04L 47/2416
2018/0192289 A1* 7/2018 Dao ..................... H04W 12/03
2018/0192337 A1* 7/2018 Ryu ..................... H04W 36/0066
(Continued)

OTHER PUBLICATIONS

International Search Report and Written Opinion dated Jul. 16, 2021 corresponding to International Patent Application No. PCT/EP2021/061217.
(Continued)

*Primary Examiner* — Jayanti K Patel
(74) *Attorney, Agent, or Firm* — Nokia Solutions and Networks Oy

(57) ABSTRACT

It is provided a method comprising: checking whether a maximum data rate for a subscriber for a network slice is received; monitoring, if the maximum data rate for the subscriber for the network slice is received, whether a hypothetical total data rate of all flows of the subscriber for the network slice would exceed the maximum data rate for the subscriber for the network slice if a grant to transmit data were provided for the subscriber for packets belonging to the network slice; inhibiting providing the grant for the subscriber if the hypothetical total data rate of all flows of the subscriber for the network slice exceeded the maximum data rate of the network slice if the grant were provided.

15 Claims, 13 Drawing Sheets

(51) Int. Cl.

| | |
|---|---|
| ***H04W 28/20*** | (2009.01) |
| ***H04W 36/16*** | (2009.01) |
| ***H04W 48/18*** | (2009.01) |
| ***H04W 76/15*** | (2018.01) |

(56) References Cited

U.S. PATENT DOCUMENTS

| | | | | |
|---|---|---|---|---|
| 2018/0199273 | A1* | 7/2018 | Chun | H04W 48/14 |
| 2018/0270782 | A1* | 9/2018 | Park | H04W 60/06 |
| 2018/0317273 | A1* | 11/2018 | Kim | H04W 76/22 |
| 2018/0324663 | A1* | 11/2018 | Park | H04W 36/00698 |
| 2019/0007879 | A1* | 1/2019 | Baek | H04W 36/0044 |
| 2019/0158985 | A1 | 5/2019 | Dao et al. | |
| 2020/0045753 | A1 | 2/2020 | Dao et al. | |
| 2021/0250845 | A1* | 8/2021 | Zhu | H04W 28/22 |
| 2022/0286895 | A1* | 9/2022 | Lee | H04W 28/0257 |
| 2022/0369155 | A1* | 11/2022 | Hedman | H04W 28/18 |
| 2022/0369204 | A1* | 11/2022 | Jeong | H04W 28/10 |

OTHER PUBLICATIONS

3GPP TS 23.501 V16.4.0 (Mar. 2020), Technical Specification, 3rd Generation Partnership Project; Technical Specification Group Services and System Aspects; System architecture for the 5G System (5GS); Stage 2 (Release 16), Mar. 2020.

3GPP TS 23.502 V16.4.0 (Mar. 2020), Technical Specification, 3rd Generation Partnership Project; Technical Specification Group Services and System Aspects; Procedures for the 5G System (5GS); Stage 2 (Release 16), Mar. 2020.

3GPP TS 23.503 V16.4.1 (Apr. 2020), Technical Specification, 3rd Generation Partnership Project; Technical Specification Group Services and System Aspects; Policy and charging control framework for the 5G System (5GS); Stage 2 (Release 16), Apr. 2020.

3GPP TS 29.518 V16.3.0 (Mar. 2020), Technical Specification, 3rd Generation Partnership Project; Technical Specification Group Core Network and Terminals; 5G System; Access and Mobility Management Services; Stage 3 (Release 16), Mar. 2020.

3GPP TS 23.221 V16.2.0 (Jun. 2019), Technical Specification, 3rd Generation Partnership Project; Technical Specification Group Services and System Aspects; Architectural Requirements (Release 16), Jun. 2019.

3GPP TR 23.700-40 V0.3.0 (Jan. 2020), Technical Report, 3rd Generation Partnership Project; Technical Specification Group Services and System Aspects; Study on Enhancement of Network Slicing Phase 2 (Release 17), Jan. 2020. (Release 16), Mar. 2020.

3GPP TS 38.300 V16.1.0 (Mar. 2020), Technical Specification, 3rd Generation Partnership Project; Technical Specification Group Radio Access Network; NR; NR and NG-RAN Overall Description; Stage 2 (Release 16), Mar. 2020.

ZTE, "Solution for KI#3 data rate per slice per UE," S2-2000379, SA WG2 Meeting #136AH, Seoul, South Korea, Jan. 13-17, Jan. 7, 2020, XP051842451.

Huawei et al., "Solution on limitation of data rate per Network Slice in UL and DL per UE," S2-2000515, SA WG2 Meeting #136AH, Incheon, South Korea, Jan. 13-17, 2020, Jan. 7, 2020, XP051842578.

Samsung, "Solution for KI#3 limitation of data rate per network slice," S2-2000694, SA WG2 Meeting #136 Ad-hoc, Jan. 13-17, 2020, Incheon, Korea, Jan. 7, 2020, XP051842749.

"Generic Network Slice Template", GSM Association, Official Document NG.116, Ver 1.0, May 23, 2019, pp. 1-60.

"3rd Generation Partnership Project; Technical Specification Group Radio Access Network; NG-RAN; NG Application Protocol (NGAP) (Release 16)", 3GPP TS 38.413, V16.1.0, Mar. 2020, pp. 1-341.

Office action received for corresponding Indian Patent Application No. 202041018543, dated Nov. 15, 2021, 6 pages.

"Support for UE-Slice-MBR", 3GPP TSG-WG SA2 Meeting #144E e-meeting, S2-2103474, Huawei, Apr. 12-16, 2021, 2 pages.

"Introduction of support of GSMA NG. 116 attributes Maximum DL/UL throughput per slice/UE", 3GPP TSG-SA2 Meeting # 144E (e-meeting), S2-2103477, Nokia, Apr. 12-16, 2021, 2 pages.

"eNS_502_KI#3_Update of Registration Procedures", 3GPP TSG-WG SA2 Meeting #144E e-meeting, S2-2103476, Xiaomi, Apr. 12-16, 2021, 2 pages.

Office action received for corresponding European Patent Application No. 21723184.4, dated Jul. 25, 2025, 6 pages.

* cited by examiner

| MBR/slice | S-NSSAI ID |
|---|---|
| Max DL = 400 Mbps<br>Max UL = 100 Mbps | S-NSSAI-1, S-NSSAI-2 |
| Max DL = 300 Mbps<br>Max UL = 50 Mbps | S-NSSAI-3 |

Fig. 4

| UE ID | S-NSSAI ID | MBR DL/UL /Slice | Aggregate GBR DL/UL | PDU session ID | SMF ID | Allocated GBR DL/UL |
|---|---|---|---|---|---|---|
| 1001 | S-NSSAI 1 | Max DL= 400Mbps<br>Max UL= 100Mbps | | 1 | SMF1 | DL=100Mbps<br>UL=10Mbps |
| | | | DL=250Mbps<br>UL=25Mbps | 2 | SMF2 | DL=150Mbps<br>UL=15Mbps |
| | S-NSSAI 2 | Max DL= 300Mbps<br>Max UL= 50Mbps | DL=75Mbps<br>UL=5Mbps | 3 | SMF1 | DL=75Mbps<br>UL=5Mbps |
| | | | | | | |

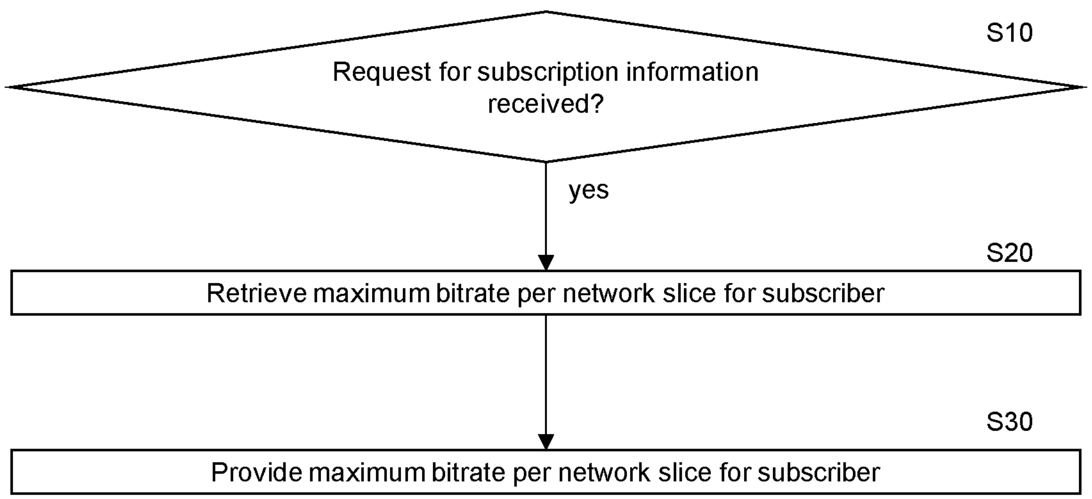
Fig. 11
Fig. 10
Fig. 12
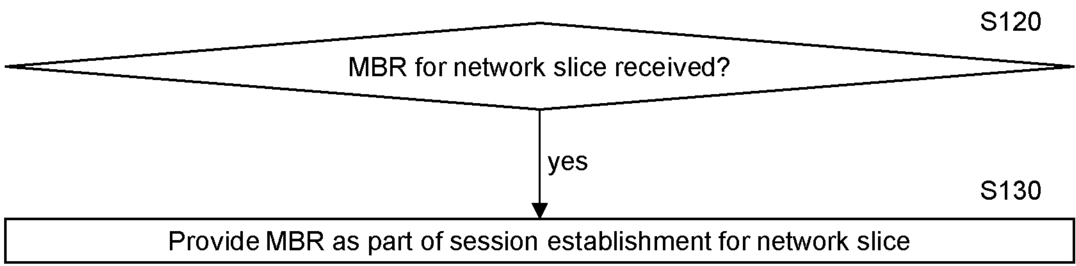
Fig. 13

CONFIGURE AND ENFORCE MAXIMUM DATA RATE PER UE PER NETWORK SLICE

FIELD OF THE INVENTION

The present disclosure relates to configuring and enforcing maximum data rate per UE per network slice. It is applicable to uplink only, or downlink only, or both uplink and downlink.

ABBREVIATIONS

3GPP 3rd Generation Partnership Project
5G 5th Generation
5GS 5th Generation System
AMBR Aggregate Maximum Bit Rate
AMF Access and Mobility Management Function
AN Access Network
DL Downlink
DNN Data Network Name
GBR Guaranteed Bitrate
GFBR Guaranteed Flow Bitrate
GSMA GSM Association
GST Generic Network Slice Template
HLR Home Location Register
HPLMN Home PLMN
kbps kilobit per second
LBO Local Breakout
LCG Logical Channel Group
MBR Maximum Bitrate
MFBR Maximum Flow Bitrate
NEST Network Slice Type
NG-RAN Next Generation Radio Access Network
NS Network Slice
NSSAI Network Slice Selection Assistance Information
NSSF Network Slice Selection Function
OAM Operations and Maintenance
PCF Policy Control Function
PDU Packet Data Unit
PLMN Public Land Mobile Network
QCI QoS Class Identifier
QoS Quality of Service
RAN Radio Access Network
SMF Session Management Function
S-NSSAI Single Network Slice Selection Assistance Information
TR Technical Report
TS Technical Specification
UDM Unified Data Management
UDR Unified Data Repository
UE User Equipment
UL Uplink
VPLMN Visited PLMN

BACKGROUND OF THE INVENTION

Part 1: Background about GSMA Parameters

GSMA NG.116 has introduced the concept of Generic Network Slice Template (GST) from which several Network Slice Types (NESTs) can be derived by assigning values to applicable attributes defined in the GST.

In this context, GST defined attributes to limit the maximum data rate (bitrate) supported by the network slice per UE in downlink and uplink. These parameters could be used to offer different contract qualities like gold, silver and bronze.

For example: maximum uplink/downlink data rate per UE per network slice, can be described as according to Table 1:

TABLE 1

| Example maximum uplink/downlink data rate per UE per network slice for different customer groups Parameters | |
|---|---|
| Value | Integer |
| Measurement unit | kbps |
| Example | Bronze customer: 50 000 Kbps<br>Silver customer: 400 000 Kbps<br>Gold customer: 1 000 000 Kbps |
| Tags | Character attribute/Functional KPI |

Part 2: Background to QoS Parameters

As Per 3GPP TS 23.501, Section 5.7.2.5:

For GBR QoS Flows only, the following additional QoS parameters exist:

Guaranteed Flow Bit Rate (GFBR)—UL and DL;
Maximum Flow Bit Rate (MFBR)—UL and DL.

The GFBR denotes the bit rate that is guaranteed to be provided by the network to the QoS Flow over the Averaging Time Window. The MFBR limits the bit rate to the highest bit rate that is expected by the QoS Flow.

GFBR and MFBR are signaled to the (R)AN in the QoS Profile and signaled to the UE as QoS Flow level QoS parameter for each individual QoS Flow.

As Per 3GPP TS 23.501, Section 5.7.2.6:

Each PDU Session of a UE is associated with the following aggregate rate limit QoS parameter:

per Session Aggregate Maximum Bit Rate (Session-AMBR).

The Session-AMBR limits the aggregate bit rate that can be expected to be provided across all Non-GBR QoS Flows for a specific PDU Session.

Each UE is associated with the following aggregate rate limit QoS parameter:

per UE Aggregate Maximum Bit Rate (UE-AMBR).

The UE-AMBR limits the aggregate bit rate that can be expected to be provided across all Non-GBR QoS Flows of a UE.

As Per 3GPP TS 38.300, Section 16.3.1:

The support of network slicing relies on the principle that traffic for different network slices is handled by different PDU sessions.

Slice awareness in NG-RAN is introduced at UE level by indicating the list of allowed S-NSSAI for the UE to the RAN, and at PDU session level, by indicating the S-NSSAI corresponding to the PDU Session, in all signalling containing PDU session resource information.

As Per 3GPP TS 38.300, Section 16.3.4.4:

One S-NSSAI is added per PDU session to be established, so NG-RAN is enabled to apply policies at PDU session level according to the SLA represented by the network slice, while still being able to apply (for example) differentiated QoS within the network slice.

REFERENCES

[1] 3GPP TS 23.501-5G; System Architecture for the 5G System;
[2] 3GPP TS 23 502-5G; Procedures for the 5G System;
[3] 3GPP TS 23 503-5G; Policy and Charging Control Framework for the 5G System; Stage 2;
[4] 3GPP TS 29.518-5G System; Access and Mobility Management Services; Stage 3;

[5] 3GPP TS 23.221—Architectural requirements;
[6] 3GPP TR 23.700-40
[7] 3GPP TS 38.300—New Radio; Overall description.

SUMMARY OF THE INVENTION

It is an object of the present invention to improve the prior art.

According to a first aspect of the invention, there is provided an apparatus comprising: one or more processors, and memory storing instructions that, when executed by the one or more processors, cause the apparatus to: check whether a request for subscription information for a subscriber is received; retrieve a respective maximum data rate for the subscriber for each of one or more network slices allowed for the subscriber if the request is received; provide an indication of the respective maximum data rate allowed for the subscriber for each of the one or more network slices allowed for the subscriber in response to the request.

According to a second aspect of the invention, there is provided an apparatus comprising: one or more processors, and memory storing instructions that, when executed by the one or more processors, cause the apparatus to: supervise if an indication of a respective maximum data rate for a subscriber for a first network slice of one or more network slices allowed for the subscriber is received; as part of an establishment of a first session of the subscriber for the first network slice, provide, to an access network, context information for the first session of the subscriber including the respective maximum data rate for the subscriber for the first network slice if the indication of the respective maximum data rate is received for the first network slice.

According to a third aspect of the invention, there is provided an apparatus comprising: one or more processors, and memory storing instructions that, when executed by the one or more processors, cause the apparatus to: check whether a maximum data rate for a subscriber for a network slice is received; monitor, if the maximum data rate for the subscriber for the network slice is received, whether a hypothetical total data rate of all flows of the subscriber for the network slice would exceed the maximum data rate for the subscriber for the network slice if a grant to transmit data were provided for the subscriber for packets belonging to the network slice; inhibit providing the grant for the subscriber if the hypothetical total data rate of all flows of the subscriber for the network slice exceeded the maximum data rate of the network slice if the grant were provided.

According to a fourth aspect of the invention, there is provided a method comprising: checking whether a request for subscription information for a subscriber is received; retrieving a respective maximum data rate for the subscriber for each of one or more network slices allowed for the subscriber if the request is received; providing an indication of the respective maximum data rate allowed for the subscriber for each of the one or more network slices allowed for the subscriber in response to the request.

According to a fifth aspect of the invention, there is provided a method comprising: supervising if an indication of a respective maximum data rate for a subscriber for a first network slice of one or more network slices allowed for the subscriber is received; as part of an establishment of a first session of the subscriber for the first network slice, providing, to an access network, context information for the first session of the subscriber including the respective maximum data rate for the subscriber for the first network slice if the indication of the respective maximum data rate is received for the first network slice.

According to a sixth aspect of the invention, there is provided a method comprising: checking whether a maximum data rate for a subscriber for a network slice is received; monitoring, if the maximum data rate for the subscriber for the network slice is received, whether a hypothetical total data rate of all flows of the subscriber for the network slice would exceed the maximum data rate for the subscriber for the network slice if a grant to transmit data were provided for the subscriber for packets belonging to the network slice; inhibiting providing the grant for the subscriber if the hypothetical total data rate of all flows of the subscriber for the network slice exceeded the maximum data rate of the network slice if the grant were provided.

Each of the methods of the fourth to sixth aspects may be a method of configuring and/or enforcing a maximum data rate per UE per network slice.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

- maximum data rate of UE per network slice is ensured
- OAM provisioning of the quota (i.e. UE-slice-MBR) may be done at UDM.
- AMF queries UDM about UE-Slice-MBR during first UE registration procedure from UDM, e.g. as part of subscription data.
- Since AMF is the anchor point for all the PDU sessions for the UE (either from same or different Network slices), it is suited to maintain the aggregate GBR and enforce maximum data rate per network slice for all the PDU sessions with GBR for different network slices. As another option, RAN may maintain the aggregate GBR and enforce maximum data rate per network slice for PDU sessions with GBR and PDU sessions without GBR.
- By indicating UE-Slice-MBR to NG-RAN during Initial Context setup procedure, NG-RAN is enabled to enforce the MBR per network slice considering the GBR and non-GBR sessions.
- The NG-RAN may associate all the QoS flows of a S-NSSAI to a Logical channel group and it may provide grants to the logical channel group in order to not exceed the UE-Slice-MBR. Thus, existing mechanism for LCG may be used.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 4 shows maximum data rates for different network slices stored in UDM according to some example embodiments of the invention;

FIG. 5 shows a table hold in AMF according to some example embodiments of the invention;

FIG. 10 shows an apparatus according to an embodiment of the invention;

FIG. 11 shows a method according to an embodiment of the invention;

FIG. 12 shows an apparatus according to an embodiment of the invention;

FIG. 13 shows a method according to an embodiment of the invention;

DETAILED DESCRIPTION OF CERTAIN EMBODIMENTS

Figure 1:
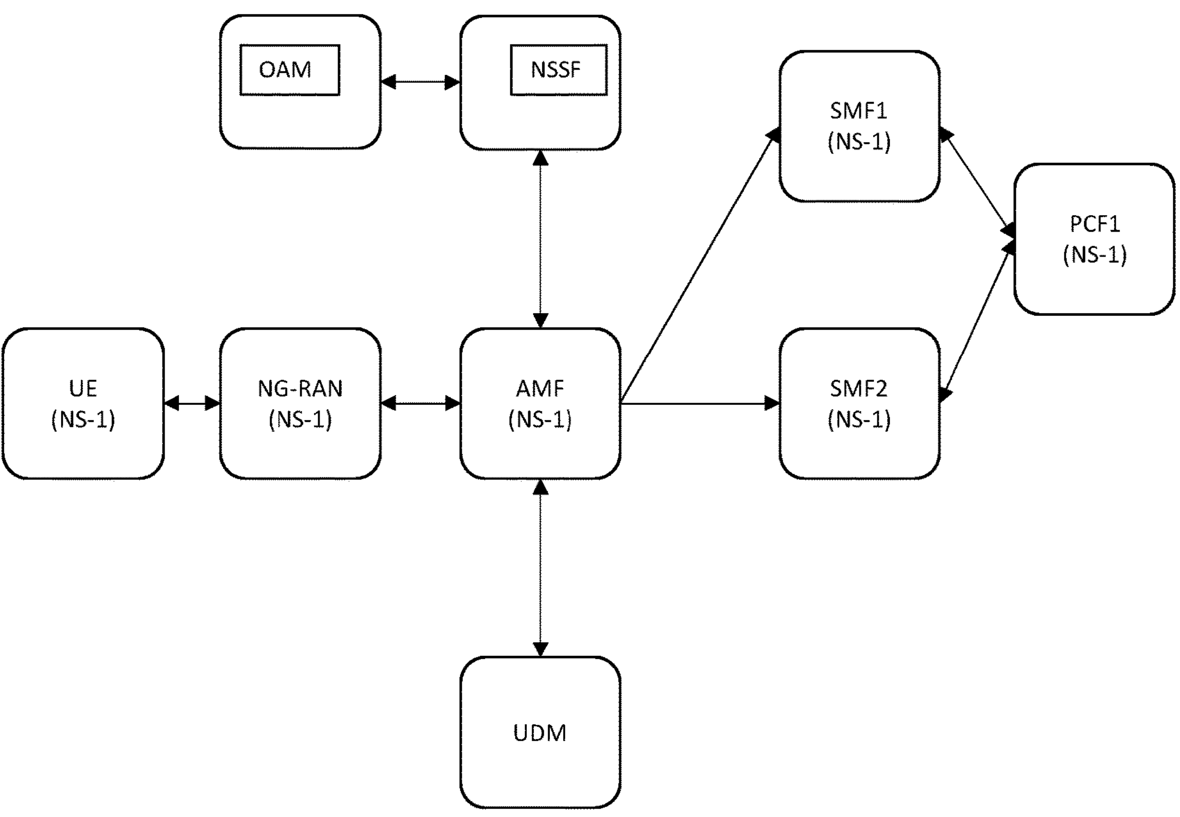
FIG. 1 shows a first deployment scenario where some example embodiments of the invention may be deployed.

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

A method to rate-limit the flows of a UE per S-NSSAI (i.e. network slice) as defined by the GSMA parameters, is currently not available in the 5GS QoS framework. The 5G system enforces a UE-AMBR (UE Aggregate Maximum Bit Rate) but not per network slice, and not for the sum of GBR and non-GBR QoS flows for the network slice. The Grants are also provided to the UE per UE and not per network slice, so the RAN cannot enforce maximum data rate per network slice, as is, in the Uplink direction, unlike the UE-AMBR.

As per 3GPP TR 23.700-40, related key issue #3 is defined for limitation of data rate per network slice in UL and DL per UE.

Whether and how to limit the data rate of UE for a network slice? (ensuring that the aggregate of the PDU sessions that use the network slice are rate limited to the rate defined for the network slice in DL and UL)

In an overview, some example embodiments of the invention provide at least one of the following functionalities:

Configuration Related (UDM)

1. UE Maximum data rate(s) per network slice (UE-Slice-MBR) is provisioned in the UDM for all S-NSSAIs allowed for the UE by a PLMN.

Functionality Related (NG-RAN, AMF):

1. AMF gets UE-Slice-MBR from UDM for allowed S-NSSAIs during the Initial UE registration procedure as part of subscription information retrieval.
2. During the N1 Initial context set up procedure the AMF provides the NG-RAN with UE-Slice-MBR per S-NSSAI for all the allowed S-NSSAIs for the UE.
3. NG-RAN enforces data rate limitation per UE per network slice based on UE-Slice-MBR considering both the GBR sessions and the non-GBR sessions for the network slice.
4. AMF (or RAN) maintains the aggregate GBR values per UE per Network slice. aggregate GBR=sum of GBRs from the active PDU sessions of the UE per network slice.
5. After successful PDU session(s) establishment or modification or release procedure, AMF (or RAN) updates the aggregate GBR for the UE per network slice.
6. AMF (or RAN) checks the available bit rate for this network slice before establishing/modifying the PDU session as below:

If {(UE-Slice-MBR>(aggregate GBR+sum of Requested PDU session's GFBR for all flows within the PDU session)}

Then accept PDU session request or modification request for the UE.

Else

GBR flows/session are not admitted and rejected with the cause "maximum data rate per UE for the network slice reached"

}

In some example embodiments, AMF (or RAN) may reject the session if the UE-Slice-MBR were exceeded due to the requested PDU session establishment or modification. In some example embodiments, AMF (or RAN) may reject only some flows of the requested PDU session establishment or modification such that the UE-Slice-MBR is not exceeded. AMF (or RAN) may indicate the rejection of a session or a flow to SMF.

7. The RAN associates all the QoS flows (i.e. GBR and non-GBR flows) of a S-NSSAI to a Logical channel group and it provides grants to the logical channel group not to exceed the UE-Slice-MBR.

Figure 2:
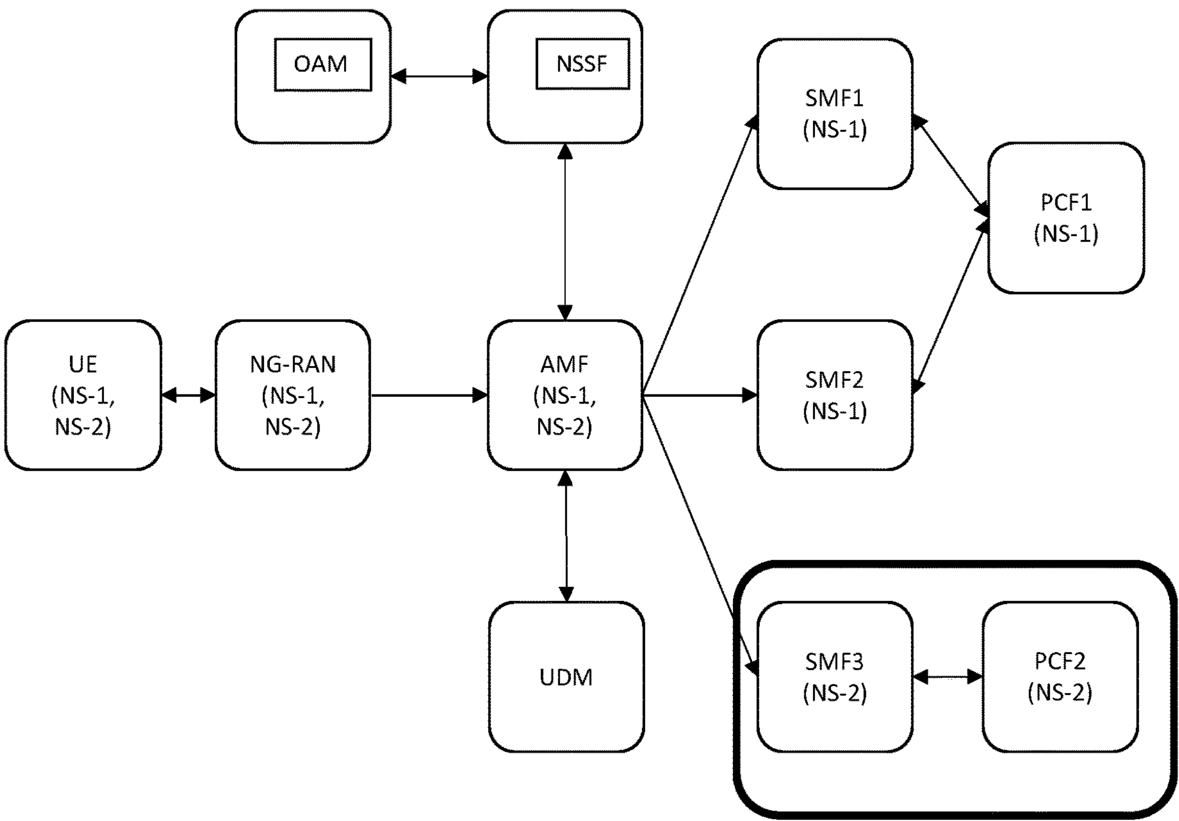
FIG. 2 shows a second deployment scenario where some example embodiments of the invention may be deployed.
Figure 3:
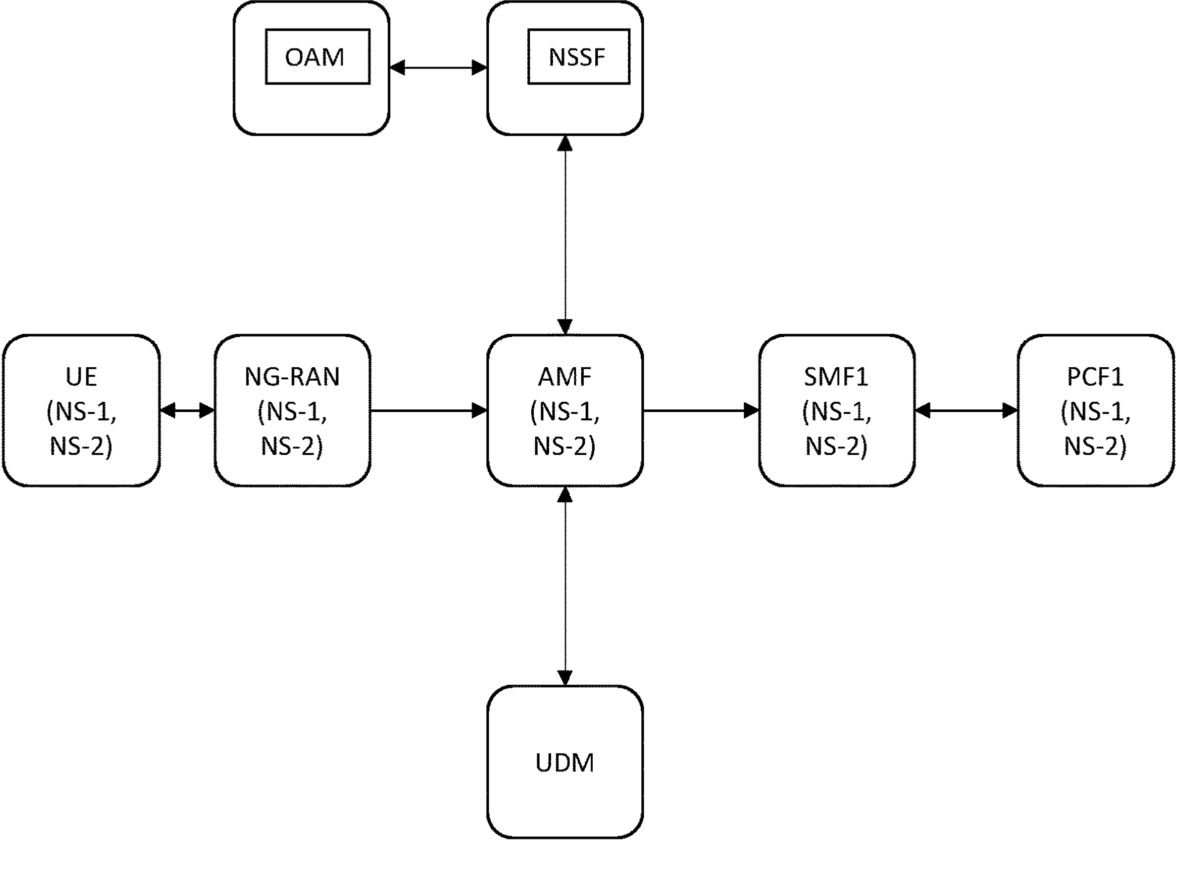
FIG. 3 shows a third deployment scenario where some example embodiments of the invention may be deployed.

Some example embodiments of the invention may be deployed in different deployment scenarios, as shown in FIGS. 1 to 3:

As shown in FIG. 1, a UE may be configured with one or multiple allowed network slices (e.g. NS-1) and UE may have PDU sessions associated with each network slice with different SMF (in FIG. 1, SMF1 and SMF2 manage sessions associated with NS-1).

As shown in FIG. 2, a UE may be configured with multiple allowed network slices (NS-1, NS-2) and UE may have PDU sessions associated with same network slice with different SMFs (in FIG. 1, SMF1 and SMF2 manage sessions associated with NS-1; in addition, SMF2 manages a session associated with NS-2). For example, NSSF may select the network slices based on load sharing properties.

As shown in FIG. 3, a UE may be configured with multiple allowed network slices (NS-1, NS-2) and may have PDU sessions associated with different network slices to be served by same SMF (SMF1 manages sessions across NS-1 and NS-2).

Configuration Updates and NF Impacts:

UDM:

According to some example embodiments, the UE subscription profile is updated with the Maximum data rate per allowed network slice UE-Slice-MBR. An example is shown in FIG. 4. In this example, the network slices (i.e., their identifiers S-NSSAIs) are grouped by the maximum data rates. In some example embodiments, instead, a maximum data rate is indicated for each S-NSSAI.

AMF:

During UE registration procedure, AMF gets UE-Slice-MBR from UE subscription data from the UDM.

AMF maintains aggregate GBR for all the PDU sessions per UE per network slice.

During the N2 Initial context set up procedure, the AMF provides the NG-RAN with UE-Slice-MBR for allowed S-NSSAIs.

During each PDU session creation, PDU session modification, and PDU session release, AMF calculates a hypothetical aggregate GBR, considering QoS guaranteed bit rates.

If the hypothetical aggregate GBR exceeds UE-Slice-MBR then no PDU session creation/modification asking for the bit rate exceeding the UE-Slice-MBR is accepted.

FIG. 5 shows an example table hold in AMF for each UE (1$^{st}$ column) and each S-NSSAI allowed for the UE (2$^{nd}$ column). In the 3$^{rd}$ column, the MBR of this UE and this network slice is indicated (here for both uplink and downlink). The 4$^{th}$ column indicates the aggregate GBR for all sessions of the UE using the respective network slice. The 4$^{th}$ column in FIG. 5 includes the sum of the GBRs actually allocated for different sessions using the respective network slice. The actually allocated GBRs are indicated in the r column.

In the example of FIG. 5, sessions 1 and 2 use the same network slice S-NSSAI 1, and session 3 uses network slice S-NSSAI 2 (5$^{th}$ column). Both sessions 1 and 3 are managed by SMF1, whereas session 2 is managed by SMF3 (6$^{th}$ column). Thus, the example of FIG. 5 corresponds to a mixture of the deployment scenario of FIG. 2 (for S-NSSAI 1 being managed by SMF1 and SMF2) and FIG. 3 (for SMF1 managing sessions on S-NSSAI 1 and S-NSSAI 2).

NG-RAN:

During the N2 Initial context setup procedure, the AMF provides the NG-RAN with UE-Slice-MBR for allowed S-NSSAIs associated to a UE.

he NG-RAN provides grants to the UE not to exceed the UE-Slice-MBR. That is, NG RAN calculates a hypothetical data rate of the UE for each allowed network slice assuming a grant is provided and provides the grant only if the hypothetical data rate does not exceed the respective UE-Slice-MBR for each of the allowed network slices. Thus, NG RAN considers both GBR flows and non-GBR flows for enforcing UE-Slice-MBR.

n some example embodiments, in order to ensure that grants are only provided if the UE Slice-MBR is not exceeded, NG-RAN associates all the QoS flows of a S-NSSAI to a Logical channel group and provides a grant to the LCG only if the hypothetical data rate does not exceed the respective UE-Slice-MBR.

RAN may identify the slice information for a given PDU session, and QoS flow as per 3GPP TS 23.502, section 4.3.2.2 (step 12):

The PDU Session ID may be used by AN signalling with the UE to indicate to the UE the association between (R)AN resources and a PDU Session for the UE.

A PDU Session is associated to an S-NSSAI of the HPLMN and, if applicable, to a S-NSSAI of the VPLMN, and a DNN. The S-NSSAI provided to the (R)AN, is the S-NSSAI with the value for the Serving PLMN (i.e. the HPLMN S-NSSAI or, in LBO roaming case, the VPLMN S-NSSAI).

In some example embodiments, instead of or in addition to AMF, NG-RAN may take care that the aggregate GBR of a UE for a network slice does not exceed UE-slice-MBR. The procedure may be the same as described for AMF.

Figure 8A:
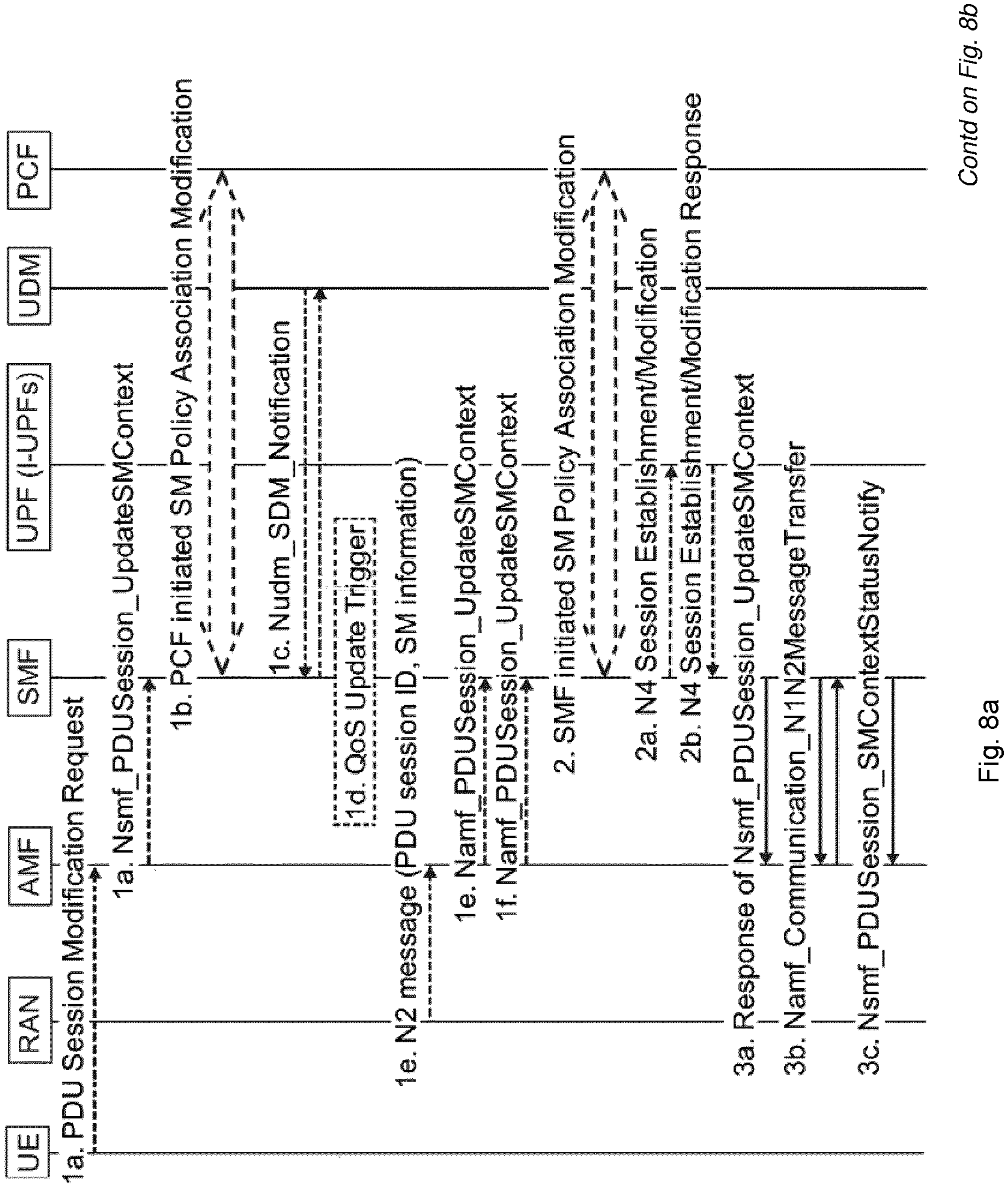
FIG. 8 indicates how the PDU session modification procedure of FIG. 4.3.3.2-1: UE or network requested PDU Session Modification (for non-roaming and roaming with local breakout) from 3GPP TS 23.502 may be updated according to some example embodiments of the invention.
Figure 8B:
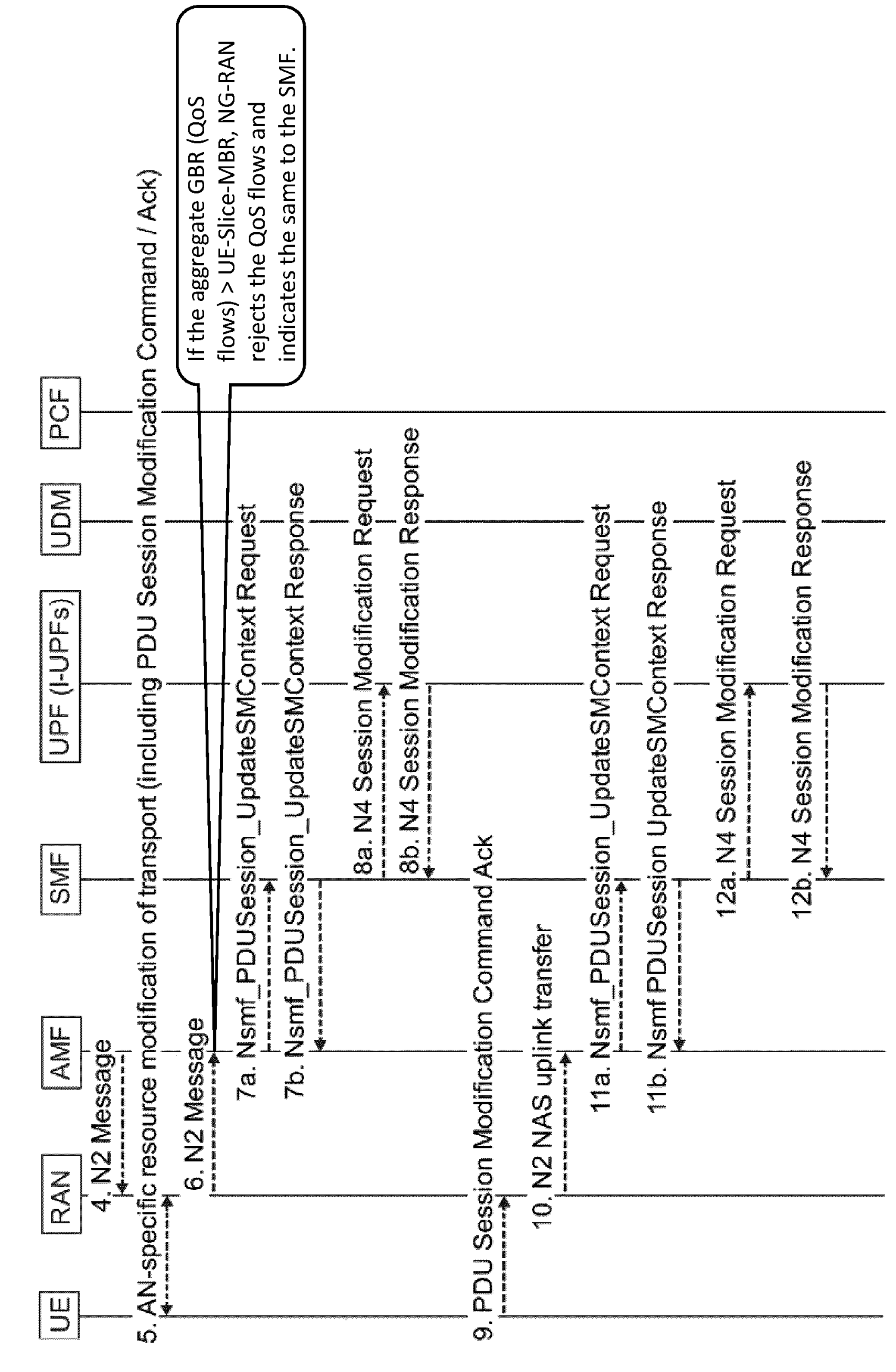
Figure 9A:
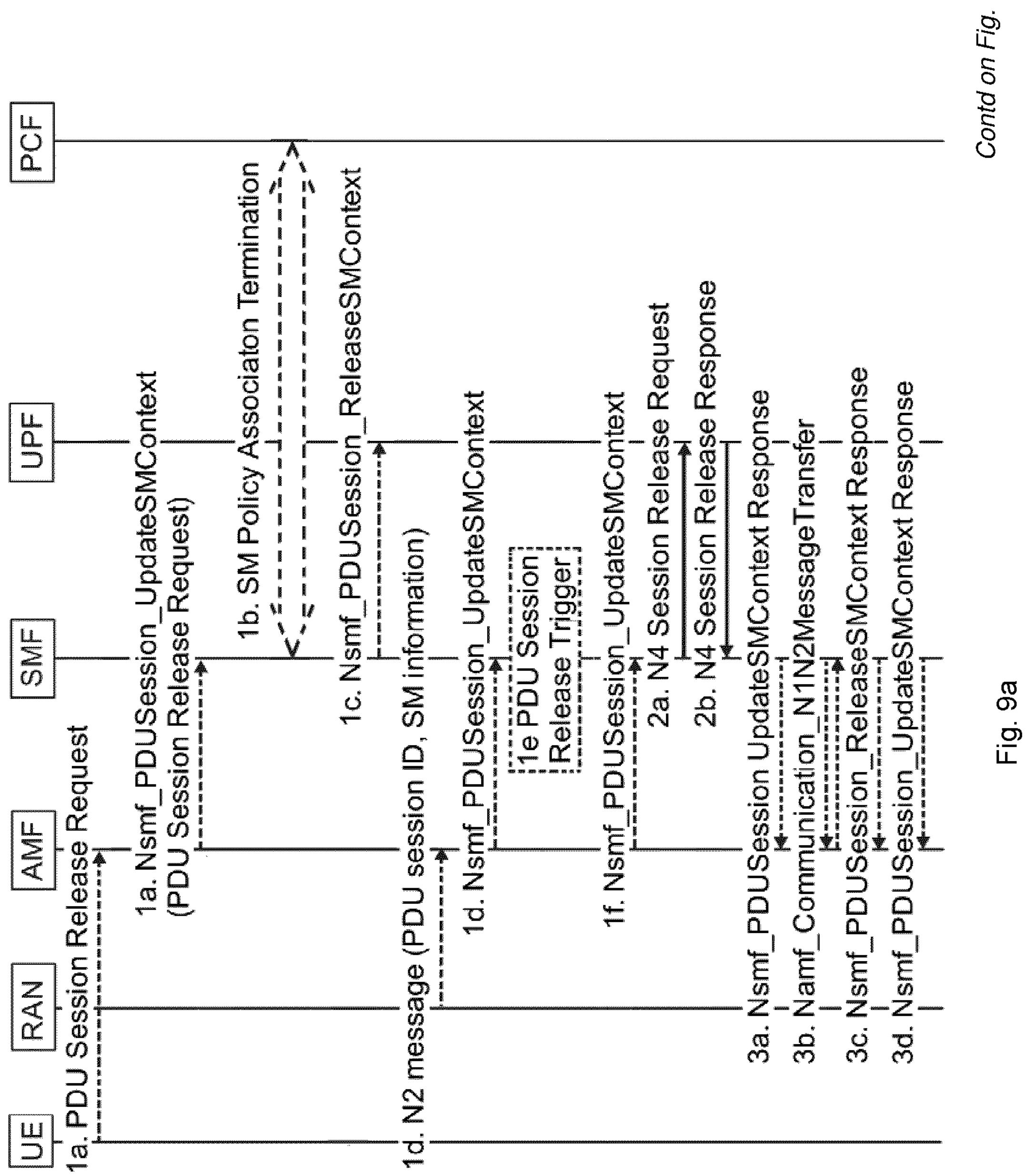
FIG. 9 indicates how the PDU session release procedure of FIG. 4.3.4.2-1: UE or network requested PDU Session Release for non-roaming and roaming with local breakout from 3GPP TS 23.502 may be updated according to some example embodiments of the invention.
Figure 9B:
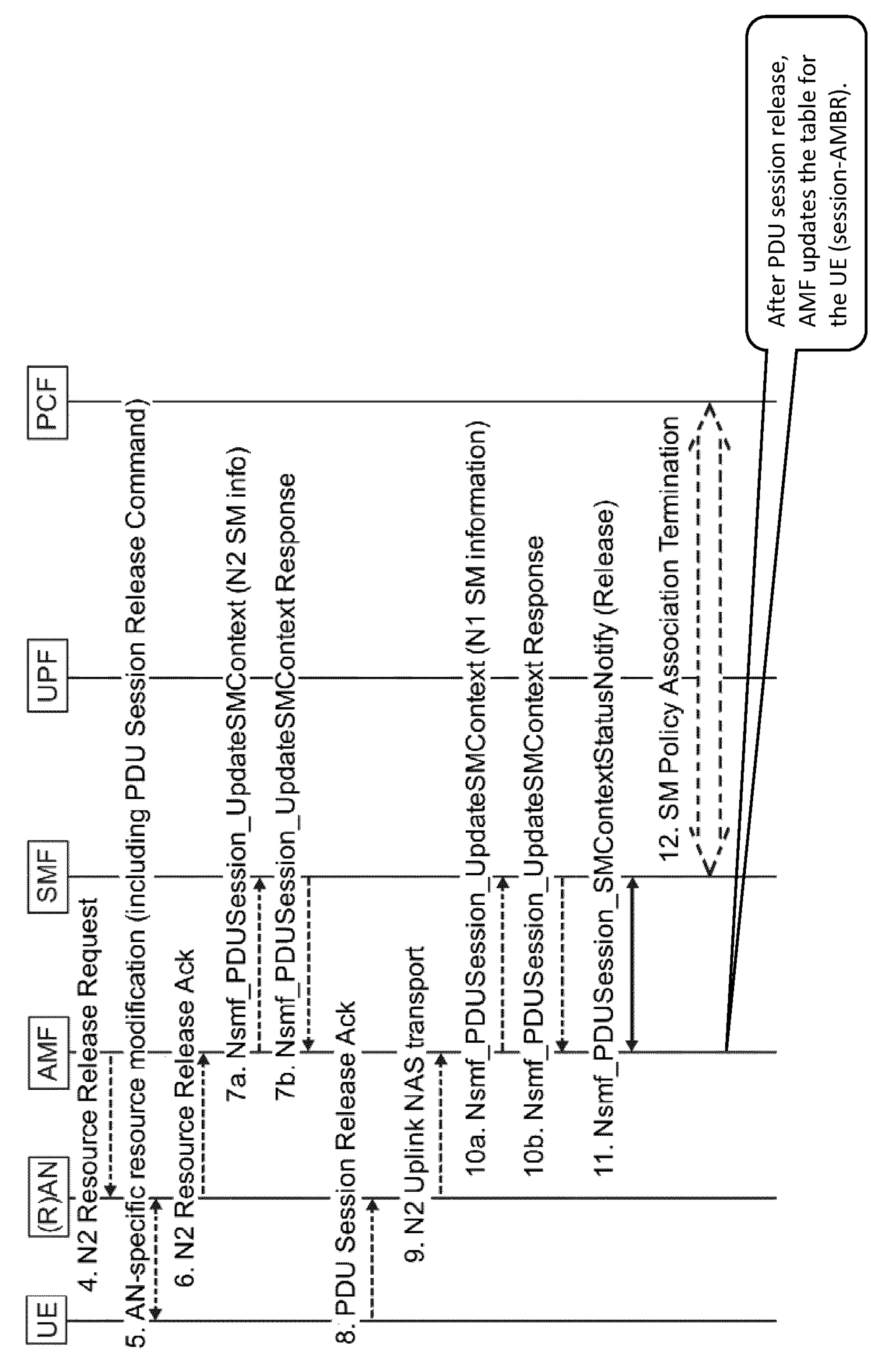

3GPP Procedure Updates:

According to some example embodiments of the invention, at least one of the following procedures is updated over the current version:

1. UE Registration procedure (FIG. 6);
2. PDU session establishment (FIG. 7);
3. PDU session modification (FIG. 8); and
4. PDU session release (FIG. 9).

FIGS. 6 to 9 show how the above 3GPP procedures may be updated. In particular, they show examples where the respective actions may be inserted in the respective conventional procedure.

Figure 6:
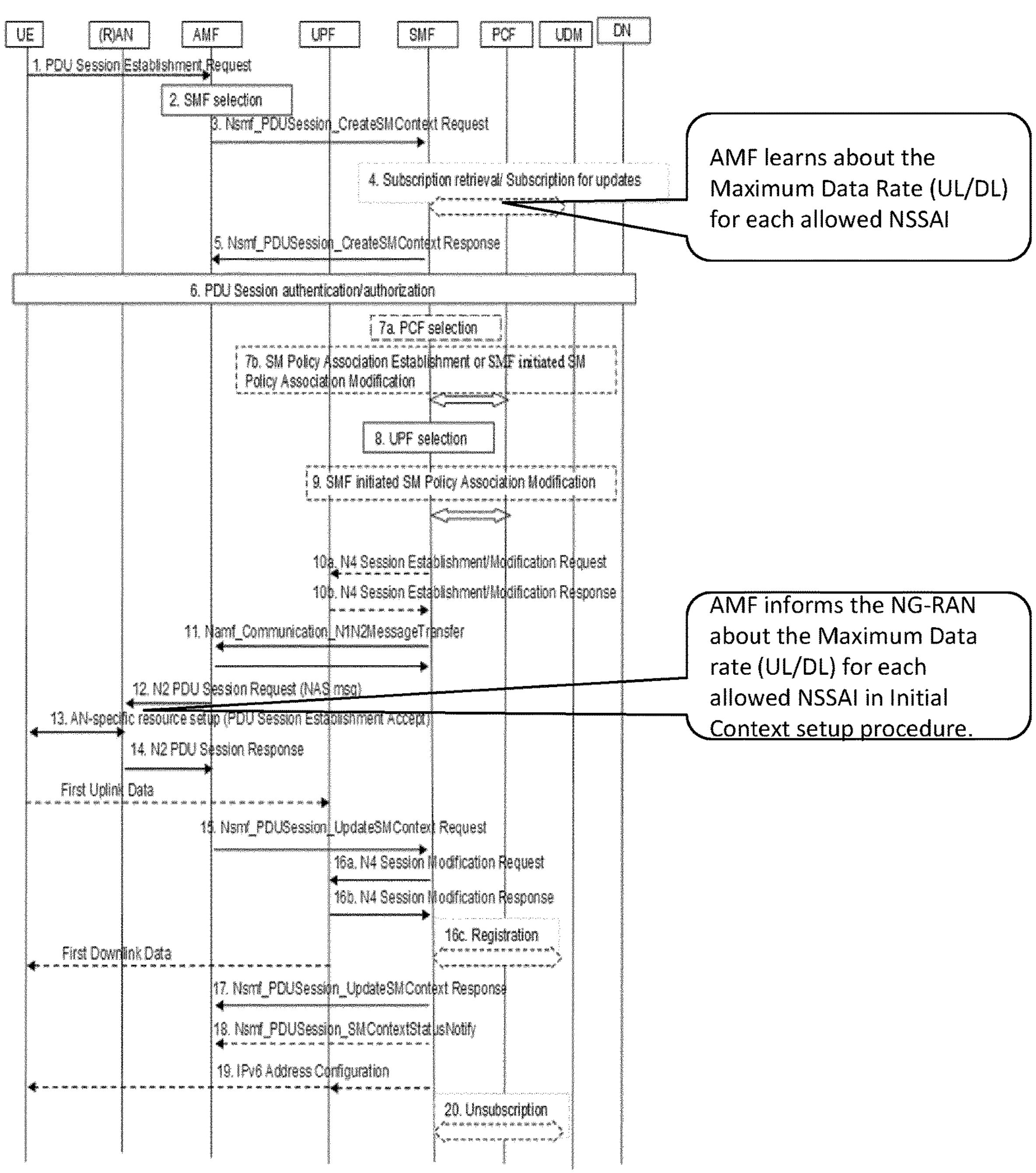
FIG. 6 indicates how the UE registration procedure of FIG. 4.2.2.2.2-1: Registration procedure from 3GPP TS 23.502 may be updated according to some example embodiments of the invention.

1. UE Registration procedure:

Compared to the UE registration procedure according to current FIG. 4.2.2.2.2-1: Registration procedure from 3GPP TS 23.502, the following actions are added, as shown in FIG. 6:

AMF learns from UDM about Maximum data rate for all the S-NSSAIs allowed for the UE during the UE registration procedure.

AMF informs the NG-RAN about the Maximum data rate for all the allowed S-NSSAIs during Initial context setup procedure or at any other time during establishment of the session of the UE.

2. PDU Session Establishment Procedure:

Compared to the PDU session establishment procedure according to current FIG. 4.3.2.2.1-1: UE-requested PDU Session Establishment for non-roaming and roaming with local breakout from 3GPP TS 23.502, the following actions are added, as shown in FIG. 7:

SMF indicates the GBR allocated for each of the QCI flows (i.e., for each flow to which a GBR is allocated);

AMF calculates the sum of the GBR to be newly allocated and the GBR already allocated for the network slice to be used by the PDU session to be established to obtain a hypothetical total GBR. If this hypothetical total GBR exceeds UE-Slice-MBR for the network slice, AMF rejects the session establishment, e.g. with cause "Maximum data rate reached for the network slice" (or similar). On the other hand, if the hypothetical total GBR does not exceed UE-Slice-MBR, AMF may admit the session establishment. Furthermore, latest after establishment of the new session, it updates its maintained value of the GBR allocated for the network slice such that it becomes the hypothetical total value.

Figure 7A:
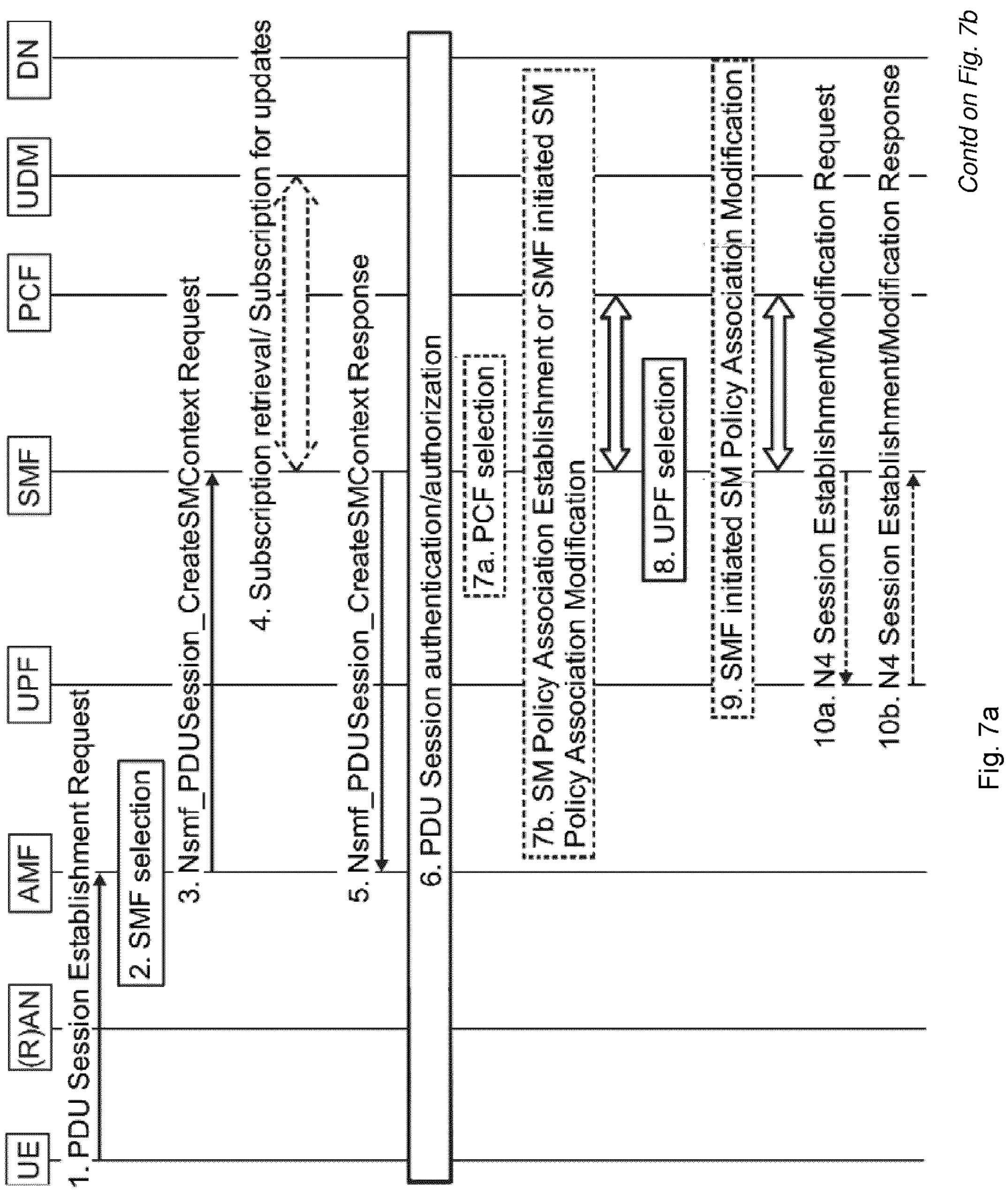
FIG. 7 indicates how the PDU session establishment procedure of FIG. 4.3.2.2.1-1: UE-requested PDU Session Establishment for non-roaming and roaming with local breakout from 3GPP TS 23.502 may be updated according to some example embodiments of the invention.
Figure 7B:
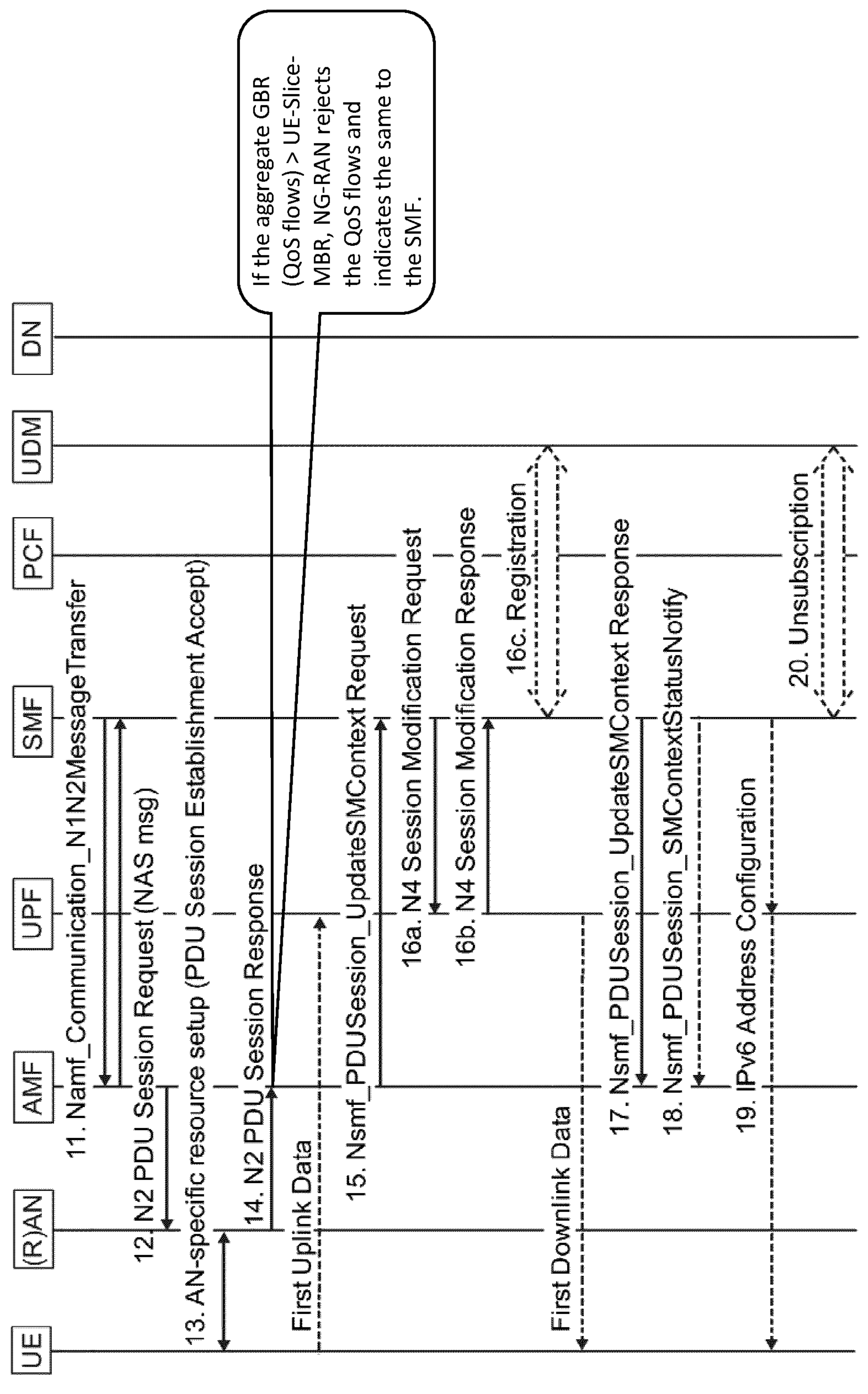

Furthermore, as also shown in FIG. 7, NG-RAN may associate all the QoS flows (i.e. GBR flows and non-GBR flows) of the UE for a S-NSSAI into a respective LCG.

Associating into LCG is a preferred option to enforce that the data rate does not exceed UE-slice-MBR, but this association is not mandatory. Then, RAN provides a grant to the UE only if the hypothetical total data rate (GBR+non-GBR) does not exceed UE-Slice-MBR.

3. PDU Session modification (UE initiated or Network initiated):

Compared to the PDU session modification procedure according to current FIG. 4.3.3.2-1: UE or network requested PDU Session Modification (for non-roaming and roaming with local breakout) from 3GPP TS 23.502, the following actions are added, as shown in FIG. 8:

SMF indicates that a modified GBR is to be allocated for one of the QCI flows (i.e., for one of the flows to which a GBR is allocated);

AMF calculates the sum of the GBR to be modified and the GBR of the other flows already allocated for the network slice used by the PDU session to obtain a hypothetical total GBR. If this hypothetical total GBR exceeds UE-Slice-MBR for the network slice, AMF rejects the modification, e.g. with cause "Maximum data rate reached for the network slice" (or similar). It may inform SMF accordingly. On the other hand, if the hypothetical total GBR does not exceed UE-Slice-MBR, AMF may admit the session modification. Furthermore, latest after modification of the session, it updates its maintained value of the GBR allocated for the network slice such that it becomes the hypothetical total value.

In some example embodiments, AMF may reject only a part of the requested modification related to some of the flows of the session and admit the modification of other flows such that the hypothetical total GBR for the network slice for the subsriber does not exceed UE-Slice-MBR.

The action to be performed by NG-RAN in this case, is the same as that shown in FIG. 7.

Compared to the PDU session release procedure according to current FIG. 4.3.4.2-1: UE or network requested PDU Session Release for non-roaming and roaming with local breakout from 3GPP TS 23.502, the following actions are added, as shown in FIG. 9:

A session release may be considered as a session modification such that the new GBR of the session is equal to 0 (i.e. the requested GBR difference of the session is equal to the current GBR of the session). Thus, a detailed description of FIG. 9 is omitted and it is referred to the description of FIG. 8 instead.

However, in some example embodiments, AMF may omit the check if the hypothetical total GBR exceeds the UE-slice-MBR. Since a session release reduces the total GBR, the condition must be always fulfilled if the condition was fulfilled before session release (unless UE-slice-MBR was modified in the meantime).

In some example embodiments, NG RAN may perform the actions performed by AMF according to FIGS. 7 to 9 (PDU session establishment/modification/release). RAN may be informed on the GBRs by the following existing procedures:

1. Step 12 of FIG. 4.3.2.2.1-1 of 3GPP TS 23.502: UE-requested PDU Session Establishment for non-roaming and roaming with local breakout; and
2. Step 4 of FIG. 4.3.3.2-1 of 3GPP TS 23.502: UE or network requested PDU Session Modification (for non-roaming and roaming with local breakout).

FIG. 10 shows an apparatus according to an embodiment of the invention. The apparatus may be a data repository, such as an UDM, UDR, or HLR, or an element thereof. FIG. 11 shows a method according to an embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for checking 10, means for retrieving 20, and means for providing 30. The means for checking 10, means for retrieving 20, and means for providing 30 may be a checking means, retrieving means, and providing means, respectively. The means for checking 10, means for retrieving 20, and means for providing 30 may be a checker, retriever, and a provider, respectively. The means for checking 10, means for retrieving 20, and means for providing 30 may be a checking processor, retrieving processor, and providing processor, respectively.

The means for checking 10 checks whether a request for subscription information for a subscriber is received (S10).

If the request for subscription information is received (S10=yes), the means for retrieving 20 retrieves a respective maximum data rate allowed for the subscriber for each of one or more network slices allowed for the subscriber (S20).

The means for providing 30 provides an indication of the respective maximum data rate for each of the one or more network slices allowed for the subscriber in response to the request (S30).

FIG. 12 shows an apparatus according to an embodiment of the invention. The apparatus may be a network function, such as an AMF, or an element thereof. FIG. 13 shows a method according to an embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for supervising 120 and means for providing 130. The means for supervising 120 and means for providing 130 may be a supervising means and providing means, respectively. The means for supervising 120 and means for providing 130 may be a supervisor and a provider, respectively. The means means for supervising 120 and means for providing 130 may be a supervising processor and providing processor, respectively.

The means for supervising 120 supervises if an indication of a respective maximum data rate for a network slice allowed for the subscriber is received (S120).

If the indication of the respective maximum data rate is received (S120=yes), the means for providing 130 provides the indication of the maximum data rate for the network slice allowed for the subscriber as part of an establishment of a session of the subscriber for the first network slice (S130). For example, the means for providing 130 may provide the indication in response to the session setup request.

Figure 14:
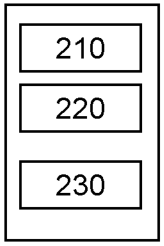
FIG. 14 shows an apparatus according to an embodiment of the invention.
Figure 15:
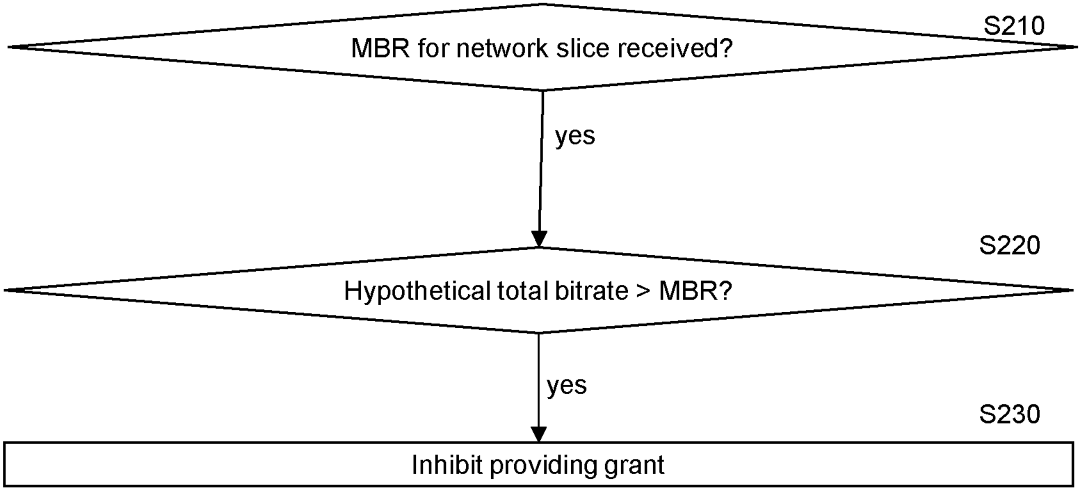
FIG. 15 shows a method according to an embodiment of the invention.

FIG. 14 shows an apparatus according to an embodiment of the invention. The apparatus may be an access network, such as a radio access network, or an element thereof, such as a eNB or gNB, or a component of such an element. FIG. 15 shows a method according to an embodiment of the invention. The apparatus according to FIG. 14 may perform the method of FIG. 15 but is not limited to this method. The method of FIG. 15 may be performed by the apparatus of FIG. 14 but is not limited to being performed by this apparatus.

The apparatus comprises means for checking 210, means for monitoring 220, and means for inhibiting 230. The means for checking 210, means for monitoring 220, and means for inhibiting 230 may be a checking means, monitoring means, and inhibiting means, respectively. The means for checking 210, means for monitoring 220, and means for inhibiting 230 may be a checker, monitor, and an inhibitor, respectively. The means for checking 210, means for monitoring 220, and means for inhibiting 230 may be a checking processor, monitoring processor, and inhibiting processor, respectively.

The means for checking 210 checks whether a maximum data rate for a subscriber for a network slice is received (S210).

If the maximum data rate for the subscriber for the network slice is received (S210=yes), the means for monitoring 220 monitors whether a hypothetical total data rate of all flows of the subscriber for the network slice would exceed the maximum data rate for the subscriber for the network slice if (=assuming that) a grant were provided for the subscriber (S220). The grant is for transmitting data for the subscriber for packets belonging to the network slice.

If the hypothetical total data rate of all flows of the subscriber for the network slice exceeded the maximum data rate of the network slice if the grant were provided (S220=yes), the means for inhibiting 230 inhibits providing the grant for the subscriber (S230).

Figure 16:
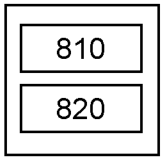
FIG. 16 shows an apparatus according to an embodiment of the invention.

FIG. 16 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 11, 13, and 15 and related description.

Some example embodiments may be employed in downlink only. Some example embodiments may be employed on uplink only. Some example embodiments may be employed in both downlink and uplink, wherein the respective maximum data rates of the UE for a network slice may be the same or different for downlink and uplink. Uplink and downlink may be treated separately from each other.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. For example, instead of the UDM, a UDR or a HLR may store the maximum data rate of a subscriber for a network slice allowed for the subscriber. According to some example embodiments, even a database separate from UDM, UDR, or HLR (such as a dedicated database) may store the maximum data rate of a subscriber for a network slice allowed for the subscriber.

In some example embodiments, the maximum data rates of the subscriber for all the network slices allowed for the subscriber are stored, evaluated, and enforced. However, in some example embodiments, the maximum data rates of the subscriber for only a subset of all network slices allowed for the subscriber are stored, evaluated, and enforced. For example, OAM may not have provided such a maximum data rate for one or more of the allowed network slices.

The tables shown in FIGS. 4 and 5 are given as examples only. E.g., the sequence of columns, the sequence of rows, the headers, the units, etc. may be appropriately modified according to some example embodiments of the invention.

According to current 3GPP specifications, S-NSSAI is used to denote a network slice unambiguously, whereas NSSAI denotes a group of 8 slices. However, the invention is not limited to these denotations. A network slice may be defined by some other identity.

In the present application, a UE may be considered as the combination of a terminal (hardware) and a user. The terminal may be e.g. a mobile phone, a smart phone, a MTC device, a laptop etc. The user may be a human user or a machine (e.g. in MTC). The terms “user” and “subscriber” are to be considered synonymously.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a repository function such as a UDM, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a network function such as a AMF, or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, an access network such as a RAN, or a component thereof (e.g. eNB or gNB), an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. An apparatus comprising:

one or more processors; and memory storing instructions of an Access and Mobility Management Function (AMF) for a wireless communication network, the instructions, when executed by the one or more processors, cause the apparatus to perform operations, the operations comprising:

retrieving subscription information for a subscriber, wherein the subscription information comprises a respective maximum data for the subscriber for each of one or more network slices allowed for the subscriber;

maintaining an aggregate Guaranteed Bitrate (GBR) for the subscriber for each of the one or more network slices, wherein the aggregate GBR is a sum of the GBRs of active Protocol Data Unit (PDU) sessions of the subscriber for respective network slices; and in response to a request for an additional PDU session or a request for modification of an active PDU session, of the active PDU sessions, for the subscriber on a network slice of the one or more network slices, perform an admission control for the additional PDU session or a modification control for the active PDU session for the subscriber on the network slice of the one or more network slices, wherein the admission control or the modification control is based on the respective maximum bit rate and the aggregate GBR for the network slice.

2. The apparatus according to claim 1, wherein the operations further comprise:

providing, to a Next Generation Radio Access Network (NG-RAN), the subscription information during an initial context setup procedure.

3. The apparatus according to claim 1, wherein the request for additional PDU session or the request for modification of the active PDU session for the subscriber on the network slice includes a requested GBR for the establishment of the additional PDU session or the modification of the active PDU session.

4. An apparatus comprising:

one or more processors; and memory storing instructions of node of a Next Generation Radio Access Network (NG-RAN) for a wireless communication network, the instructions, when executed by the one or more processors, cause the apparatus to perform operations, the operations comprising:

receiving a maximum data rate for a subscriber for a network slice;

associate all packet flows of the subscriber for the network slice to a logical channel group;

determining whether a hypothetical total data rate of the logical channel group exceeds the maximum data rate for the subscriber for the network slice in an event a grant to transmit data through the logical channel group is provided to the subscriber; and inhibiting providing the grant for the transmission of the data through the logical channel group to the subscriber if the hypothetical total data rate of the logical group exceeds the maximum data rate for the subscriber for the network slice.

5. The apparatus according to claim 4, wherein the operations further comprise:

monitoring a request for a session setup for the network slice for the subscriber, wherein the request includes a requested guaranteed data rate;

calculating a hypothetical guaranteed data rate for the subscriber for the network slice as a sum of a current aggregated guaranteed data rate for the subscriber for the network slice and the requested guaranteed data rate;

accepting the request for the session setup in an event the hypothetical guaranteed data rate is less than the maximum data rate for the subscriber for the network slice and rejecting request for the session setup in an event the hypothetical guaranteed data rate is larger than the maximum data rate for the subscriber for the network slice.

6. The apparatus according to claim 5, wherein the operations further comprise:

monitoring a request for a modification of the requested guaranteed data rate of an active session of the subscriber on the network slice, wherein the modification includes a request for a data rate difference;

calculating a modified hypothetical guaranteed data rate for the subscriber for the network slice as a sum of a current aggregated guaranteed data rate for the subscriber for the network slice and the data rate difference;

accepting the request for the modification, and update the current aggregated guaranteed data rate for the subscriber for the network slice to the modified hypothetical guaranteed data rate in an event the modified hypothetical guaranteed data rate is less than the maximum data rate for the subscriber for the network slice; and rejecting the request for the modification in an event the modified hypothetical guaranteed data rate is larger than the maximum data rate for the subscriber for the network slice.

7. The apparatus according to claim 6, wherein the modified hypothetical guaranteed data rate is calculated as the current aggregated guaranteed data rate minus the guaranteed data rate of the session.

8. A method for wireless communication, the method comprising:

retrieving, by an Access and Mobility Management Function (AMF) from a Unified Data Management, subscription information for a subscriber, wherein the subscription information comprises a respective maximum data rate for the subscriber for each of one or more network slices allowed for the subscriber;

maintaining, by the AMF, an aggregate Guaranteed Bitrate (GBR) for the subscriber for each of the one or more network slices, wherein the aggregate GBR is a sum of the GBRs of active Protocol Data Unit (PDU) sessions of the subscriber for respective network slices; and in response to a request for an additional PDU session or a request for modification of an active PDU session, of the active sessions, for the subscriber on a network slice of the one or more network slices, performing, by the AMF, an admission control for the additional PDU session or a modification control for the active PDU session for the subscriber on the network slice of the one or more network slices, wherein the admission control or the modification control is based on the respective maximum bit rate and the aggregate GBR for the network slice.

9. The method according to claim 8, further comprising:

providing, from the AMF to a Next Generation Radio Access Network, the subscription information in response to a request, during an initial context setup procedure.

10. The method according to claim 8, wherein the admission control for the additional PDU session or the modification control for the active PDU session is responsive to receiving a request to establish the PDU session or modify the active PDU session, where the request includes a requested GBR for the establishment of the additional PDU session or the modification of the active PDU session.

11. A non-transitory computer-readable medium comprising a set of instructions of an Access and Mobility Management Function (AMF) encoded thereon which, when executed by an apparatus, cause the apparatus to perform:

retrieving, from a Unified Data Management, subscription information for a subscriber, wherein the subscription information comprises a respective maximum data rate for the subscriber for each of one or more network slices allowed for the subscriber;

maintaining an aggregate Guaranteed Bitrate (GBR) for the subscriber for each of the one or more network slices, wherein the aggregate GBR is a sum of the GBRs of active Protocol Data Unit (PDU) sessions of the subscriber for respective network slices; and in response to a request for an additional PDU session or a request for modification of an active PDU session, of the active sessions, for the subscriber on a network slice of the one or more network slices, performing an admission control for the additional PDU session or a modification control for the active PDU session for the subscriber on the network slice of the one or more network slices, wherein the admission control or the modification control is based on the respective maximum bit rate and the aggregate GBR for the network slice.

12. A method for wireless communication, the method comprising:

receiving, by a Next Generation Radio Access Network (NG-RAN), a maximum data rate for a subscriber for a network slice;

associate, by the NG-RAN, all packet flows of the subscriber for the network slice to a logical channel group;

determining, by the NG-RAN, whether a hypothetical total data rate of the logical channel group exceeds the maximum data rate for the subscriber for the network slice in an event a grant to transmit data through the logical channel group is provided to the subscriber; and inhibiting, by the NG-RAN, providing the grant for the transmission of the data through the logical channel group to the subscriber if the hypothetical total data rate of the logical channel group exceeds the maximum data rate for the subscriber for the network slice.

13. The method according to claim 12, further comprising:

monitoring a request for a session setup for the network slice for the subscriber, wherein the request includes a requested guaranteed data rate;

calculating a hypothetical guaranteed data rate for the subscriber for the network slice as a sum of a current aggregated guaranteed data rate for the subscriber for the network slice and the requested guaranteed data rate;

accepting the request for the session setup in an event the hypothetical guaranteed data rate is less than the maximum data rate for the subscriber for the network slice; and rejecting the request for the session setup in an event the hypothetical guaranteed data rate is larger than the maximum data rate for the subscriber for the network slice.

14. The method according to claim 13, further comprising:

monitoring a request for a modification of the requested guaranteed data rate of an active session of the subscriber on the network slice, wherein the modification includes a request for a data rate difference;

calculating a modified hypothetical guaranteed data rate for the subscriber for the network slice as a sum of a current aggregated guaranteed data rate for the subscriber for the network slice and the data rate difference;

accepting the request for the modification and updating the current aggregated guaranteed data rate for the subscriber for the network slice to the modified hypothetical guaranteed data rate in an event the modified hypothetical guaranteed data rate is less than the maximum data rate for the subscriber for the network slice; and rejecting the request for the modification in an event the modified hypothetical guaranteed data rate is larger than the maximum data rate for the subscriber for the network slice.

15. The method according to claim 14, wherein, the modified hypothetical guaranteed data rate is calculated as the current aggregated guaranteed data rate minus the guaranteed data rate of the session.

* * * * *